(12) United States Patent
McCloskey et al.

(10) Patent No.: US 9,552,630 B2
(45) Date of Patent: Jan. 24, 2017

(54) MOTION DEBLURRING

(71) Applicant: Honeywell International Inc., Morristown, NJ (US)

(72) Inventors: Scott McCloskey, Minneapolis, MN (US); Kelly Muldoon, Minneapolis, MN (US); Sharath Venkatesha, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 110 days.

(21) Appl. No.: 14/176,984

(22) Filed: Feb. 10, 2014

(65) Prior Publication Data

US 2015/0042829 A1 Feb. 12, 2015

Related U.S. Application Data

(60) Provisional application No. 61/810,115, filed on Apr. 9, 2013.

(51) Int. Cl.
*H04N 5/232* (2006.01)
*G06T 5/00* (2006.01)

(52) U.S. Cl.
CPC ............ *G06T 5/003* (2013.01); *H04N 5/23258* (2013.01); *H04N 5/23267* (2013.01); *G06T 2200/21* (2013.01)

(58) Field of Classification Search
CPC ............ H04N 5/23264; H04N 5/23258; H04N 5/23267; G06T 5/003; G06T 2200/21
USPC ................ 348/208.4, 208.5, 208.11
See application file for complete search history.

(56) References Cited

U.S. PATENT DOCUMENTS

| | | | |
|---|---|---|---|
| 2004/0174459 A1* | 9/2004 | Holt et al. ............... 348/452 |
| 2008/0192116 A1* | 8/2008 | Tamir ............... G06T 7/2093 348/157 |
| 2009/0128639 A1* | 5/2009 | Ozluturk ............ H04N 5/23248 348/208.5 |
| 2009/0244300 A1* | 10/2009 | Levin ............... G03B 17/00 348/208.5 |
| 2010/0026821 A1* | 2/2010 | Sato ............... G03B 5/00 348/208.99 |
| 2011/0096177 A1* | 4/2011 | McCloskey ............ 348/207.11 |
| 2011/0122268 A1* | 5/2011 | Okamoto et al. ........ 348/208.12 |
| 2013/0021483 A1* | 1/2013 | Bennett et al. ........... 348/208.4 |
| 2013/0229529 A1* | 9/2013 | Lablans ............ H04N 5/23238 348/169 |
| 2013/0293761 A1* | 11/2013 | Guenter ............... H04N 17/002 348/345 |
| 2014/0002606 A1* | 1/2014 | Blayvas ............ G02B 27/0075 348/46 |
| 2014/0320704 A1* | 10/2014 | Shuda et al. ............ 348/241 |
| 2015/0036008 A1* | 2/2015 | Mishra ............ H04N 5/23264 348/208.6 |

* cited by examiner

*Primary Examiner* — Nhan T Tran
*Assistant Examiner* — Chan Nguyen
(74) *Attorney, Agent, or Firm* — Brooks, Cameron & Huebsch, PLLC

(57) ABSTRACT

Motion de-blurring systems and methods are described herein. One motion de-blurring system includes an image sensing element, one or more motion sensors in an imaging device, a lens element that undergoes motion during a capture of an image by the sensing element, and a de-blurring element to de-blur the image captured by the sensing element via de-convolving a Point Spread Function (PSF).

19 Claims, 12 Drawing Sheets

MOTION DEBLURRING

GOVERNMENT RIGHTS

This invention was made with Government support under Contract Number: W911NF-11-C-0253. The Government has certain rights in the invention.

TECHNICAL FIELD

The present disclosure relates to methods, devices, and systems for reducing or eliminating motion blur from an image.

BACKGROUND

Motion blur is a nuisance that can reduce both the aesthetic appeal and the utility of images captured when objects in the scene are not stationary. Likewise, motion blur can arise when the camera itself moves during exposure.

While motion de-blurring is a long-standing area of research, the field has broadened in recent years to include the capture and processing of moving scenes by computational cameras. Much of this recent work has addressed the issue that, even for linear, constant-velocity motion, traditional cameras fail to capture information about the world at certain spatial frequencies, resulting in a loss of texture.

In order to avoid such loss of texture, several acquisition techniques have been proposed to capture all spatial frequencies present in the scene. Unlike traditional cameras, these computational photographic methods capture visual information in a format that is not intended for immediate viewing. Instead, information about the scene is encoded in a photographic data structure from which a sharply-focused image can be derived.

Coded exposure is one such method, where the appearance of a moving object is encoded so that it can be derived by numerically stable de-convolution. In order to determine the parameters of that de-convolution, however, blur estimation must be performed.

DETAILED DESCRIPTION

The present disclosure discusses the concept of motion de-blurring using a computational camera implementing motion invariance. In order to avoid image-based blur estimation and segmentation, embodiments of the present disclosure utilize a motion invariant camera to capture an image while a stabilizing lens element undergoes motion (e.g., parabolic motion).

Building on previously utilized techniques, embodiments of the present disclosure can improve the performance of motion invariance in several ways. For example, the captured image can be de-blurred with a Point Spread Function (PSF) that is a better fit to the actual PSFs of moving objects in the scene, reducing ghosting artifacts in the final image.

In some embodiments, an optimal strategy for motion invariance is to increase the camera's ISO in response to reduced illumination rather than to increase the exposure time. This same result allows embodiments of the present disclosure to capture more optimal motion invariant images for asymmetric scene motion priors.

Also disclosed herein is a motion invariant camera (e.g., hand-held) utilizing optical components and sensors which may be already present in a lens with image stabilization functionality, wherein the camera can be modified such that the sensors can be used to provide a consistent range of invariance despite motion of the camera during exposure, in embodiments disclosed herein.

Because blur estimation from coded exposure or traditional cameras as discussed above is ill posed, motion invariance, as discussed in the present disclosure, can be utilized to invertibly capture scene texture without the need for blur estimation. This can be achieved, for example, by moving some part of the camera during image capture, in such a way that all objects in the scene (including stationary ones) are encoded with the same motion Point Spread Function (PSF). A motion invariant photographic data structure can thus be de-convolved with a PSF determined by a priori calibration, obviating the need for blur estimation.

Figure 1:
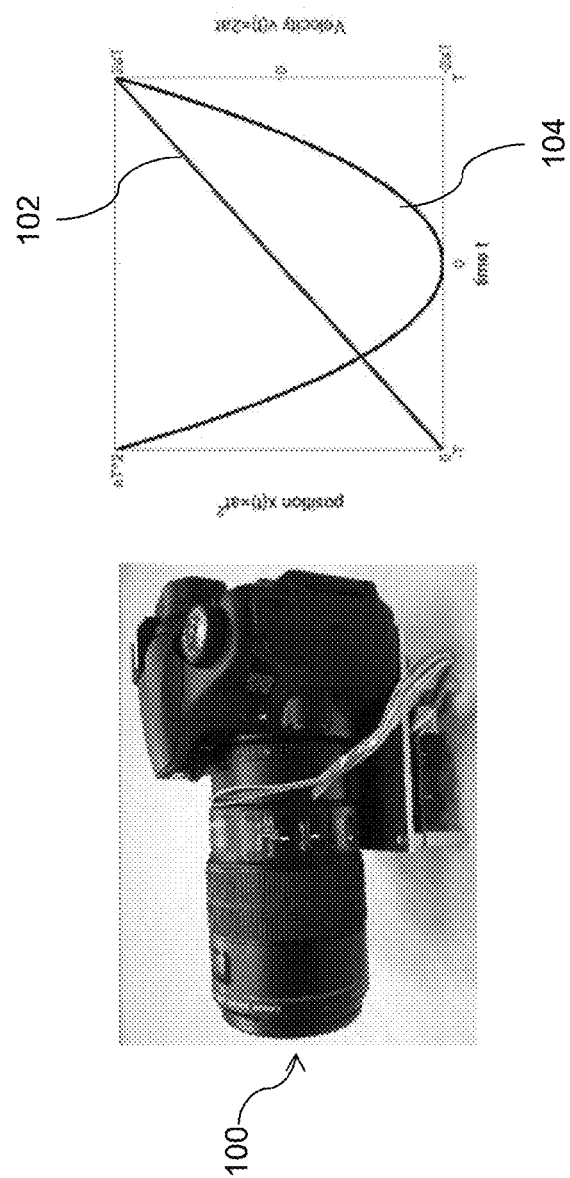
FIG. 1 provides a left side having an example of an imaging device that can be used with embodiments of the present disclosure and a right side illustrating parabolic motion and lens velocity, illustrating the range of object velocities which are stabilized during exposure.

Motion invariance can typically be utilized for one velocity magnitude however, in embodiments of the present disclosure, the PSFs of objects with comparable velocities are similar enough that, after de-convolution, they appear sufficiently well-focused. In the present disclosure, the analysis of the extent of motion invariance provided by lens motion (e.g., parabolic) is discussed. Also described, is an implementation of motion invariance using optical components present in Digital Single Lens Reflex (DSLR) lenses with optical Image Stabilization (IS) functionality (an example camera 100 is shown in FIG. 1). In such embodiments, motion invariance can be extended to incorporate available motion information while still avoiding image-based blur estimation.

Using the sensors included in DSLR IS lenses, knowledge of the camera's motion can be used to achieve the same level of invariance to object motion even when the camera moves during exposure. A parabolic motion can, for example, be adapted to achieve invariance when the distribution of expected object velocity is symmetric or asymmetric.

One objective of motion invariant image capture is to obviate PSF estimation, thus avoiding blind de-convolution, by capturing an image with a motion blur PSF that does not depend on the real-world velocity of a moving object. For an object with any particular velocity, motion blur can be prevented by translating the lens in the same direction as the object in order to slow or stop motion, (i.e., to ensure that its projection on the sensor does not move).

The explanation of motion invariant capture is that, by translating (i.e., moving) the lens or other imaging device element discussed herein with constant acceleration along the object motion direction, objects with velocities in a certain range can have the motion of their projections stopped at some point, and these objects will have approximately the same PSF, and thereby their PSF is well-approximated by the a priori calibrated PSF. If the object appears slowed rather than stopped, the PSF can be better estimated than via traditional methods.

Motion invariance can be implemented by translating any of the camera body, sensor, or lens with constant acceleration. We use optical stabilization hardware to implement motion invariance by lens motion.

In a one dimensional (1D) example, the lens moves along a line in the direction of expected motion. For example, a lens can have a motion with initial rightward velocity (e.g., rightward with respect to the general direction in which light is impinging on the surface of an imaging sensor), among other directions. A rightward direction will be used in the following example, however the present disclosure should not be so limited and any suitable direction could be utilized in some embodiments (e.g., leftward, upward, downward, diagonal, etc.).

In one example embodiment, at the beginning of the image's exposure, the lens translates rightwardly with a given velocity, and constant (e.g., negative) acceleration a is applied. During an exposure duration of 2T milliseconds, with the time variable $t \in [-T, T]$ for mathematical convenience, the acceleration causes the lens to come to a stop at $t=0$ and, at the end of the exposure period ($t=T$), the lens has returned to its initial position with the same velocity magnitude (but in the opposite direction) as in the beginning. Though the motion of the lens is linear, this pattern is referred to as parabolic motion, in this example, because the horizontal position x is a parabolic function of time t, $$x(t)=at^2 \qquad (1)$$

The right image of FIG. 1 shows parabolic motion 104 and lens velocity 102 (the derivative of x), illustrating the range of object velocities which are stabilized during exposure. As in other work, blur in a motion invariant image is modeled as the convolution of a latent image I with a PSF B, giving the blurred image $$I_b = I*B + \eta, \qquad (2)$$

where $\eta$ represents noise.

In the text below, it is discussed that previous approaches have used a sub-optimal PSF for de-convolution, and that use of a different PSF can reduce Root Mean Squared Error (RMSE) in the estimated latent image. The embodiments of the present disclosure provide a better mechanism for obtaining a PSF as will be discussed in more detail below.

As discussed herein, the present disclosure includes system, device, and method embodiments. For example, in one system, the embodiment includes; a motion invariant camera sensing element, one or more motion sensors in the camera, a stabilizing lens element that undergoes motion during a capture of an image by the sensing element, and a de-blurring element to de-blur the image captured by the sensing element via de-convolving a Point Spread Function (PSF).

In some embodiments, the motion de-blurring system can include a motion sensor that records the actual motion of the stabilizing lens element. The recorded actual motion can, for example, be used to determine the PSF used in de-convolution. For instance, a motion sensor can record the motion of the camera body during exposure. The recorded motion of the camera body is used to determine the motion of the stabilizing lens element. The recorded motion of the camera body is used to determine the PSF used in de-convolution.

In some embodiments, a motion de-blurring system can include a motion invariant camera sensing element, a stabilizing lens element that undergoes motion during a capture of an image of a scene by the sensing element, and a de-blurring element to de-blur the image captured by the sensing element via de-convolving a Point Spread Function (PSF) which incorporates prior information about object motion in the scene.

In various embodiments, the image captured by the sensing element can be compared to a second image captured while the stabilizing lens is stationary, in order to separate moving objects from the stationary background. In some embodiments, prior information about the size of moving objects is used to segment moving objects from the stationary background. In various embodiments, the PSF used for de-blurring is designed to minimize reconstruction errors (e.g., RMSE) with respect to the prior information about object motion.

As discussed above, in some embodiments, the PSF used for de-blurring can be derived from one or more PSFs corresponding to objects with non-zero velocities. This can be one mechanism for using a PSF that is a better fit to the actual PSFs of moving objects in the scene. In various embodiments, the stabilizing lens element's motion and the PSF can be configured to de-blur an image that captures objects moving in one lateral direction.

The stabilizing lens element can undergo motion such that de-blurring can be accomplished for multiple velocity magnitudes. In some embodiments, for example, the system includes sensors to sense camera motion and a lens element that can be moved in at least one dimension. As such, in some embodiments, the motion of the stabilizing lens element produces a 1D motion invariant PSF in the presence of non-linear camera motion.

In various embodiments, a motion de-blurring system, can include a motion invariant camera sensing element, a motion providing element that provides motion to at least one of a imaging device body, an imaging sensor, or lens with constant acceleration during a capture of an image by the sensor, and a processor for controlling the motion of the at least one of the imaging device body, an imaging sensor, or lens.

The system can include a microprocessor or microcontroller to control motion of the lens, imaging device body, and/or imaging sensor. The microcontroller saves a number of lens, imaging device body, and/or imaging sensor positions, during exposure in the capturing of an image, in memory.

In some embodiments, a linear spline is fit to the number of lens positions to generate a PSF. A time value can be interpolated at an intersection of one or the number of lens positions with a pixel boundary. Multiple time values can be interpolated and differentiated (time differentials) in order to determine an amount of time that light from a moving point fell on a particular pixel.

In various embodiments, the time differentials can be normalized by a total exposure time in order to produce a PSF whose elements sum to 1. In some such embodiments, the normalization can be repeated for several different initial sub-pixel positions and results can be averaged.

$$t(x) = \begin{cases} \dfrac{s - \sqrt{s^2 + 4ax}}{2a} & \text{if } \dfrac{dx}{dt} \leq 0 \\ \dfrac{s + \sqrt{s^2 + 4ax}}{2a} & \text{if } \dfrac{dx}{dt} > 0 \end{cases} \quad (3)$$

What PSF should be de-convolved?

Previous work with motion invariance has used a PSF B value in de-convolution which is determined analytically or experimentally (i.e., by calibration) to represent the blurring of stationary objects in the scene. Without analysis, this seems like a worthwhile choice because (a) the s=0 PSF is easier to characterize empirically and (b) the expected value of velocity with a uniform distribution over the range [−S, S] is s=0.

However, de-convolving this PSF may not provide optimal performance because, despite 0 being the expected value over a uniform distribution of velocities in [−S, S], the value of $B_0$ (i) is not the expected value of $B_s$(i) over the range [−S, S] because the velocity term is squared in this instance. In the sense that $B_0(i) \geq B_s(i)$ for values of i before $B_s$'s tail clip, and $B_0(i) = 0 \leq B_s(i)$ beyond the tail clip, $B_0$ is an extreme case of the PSF, in this example.

Instead of de-convolving $B_0$ from the captured image, then, the PSF $B_e$ can be de-convolved a such that each value of $B_e(i)$ has the expected value over the desired range of motion invariance. It should be straightforward to derive a closed form of this PSF, and thus the details have been omitted from this disclosure and it should be noted that $B_e$ can be found by averaging several PSFs $B_s$ over the desired velocity range.

Figure 2:
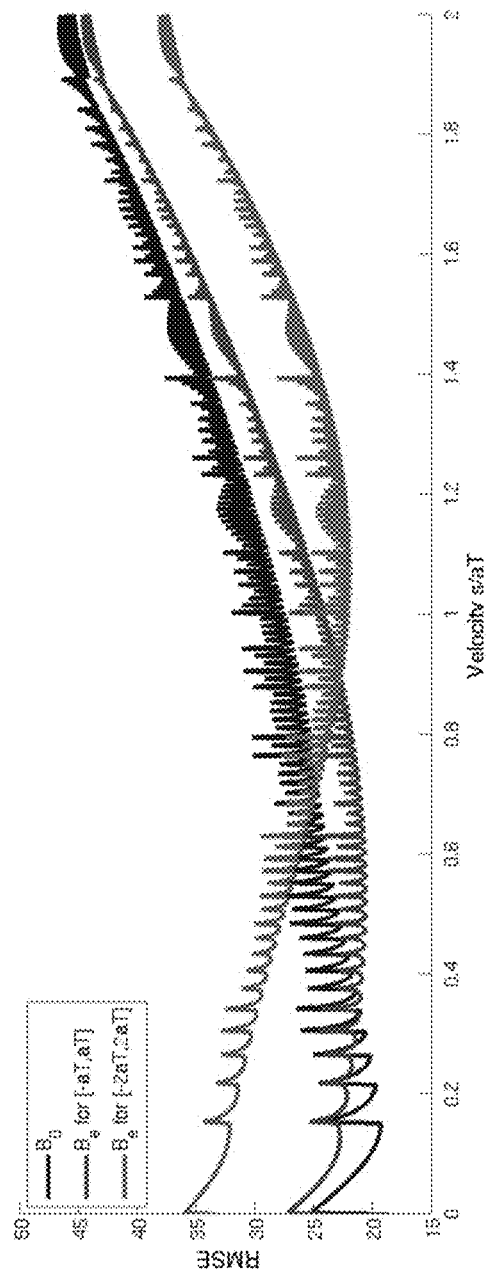
FIG. 2 illustrates two methods of calculating a point spread function (PSF) with regard to Root Mean Squared Error (RMSE) and velocity.

FIG. 2 shows a performance comparison of these two approaches, with the $B_0$ performance curve compared to two different PSFs $B_e$ containing expected values for s∈[−aT, aT] and s∈[−2aT, 2aT]. Quantitatively, the use of $B_e$ induces higher RMSE for slow-moving objects (particularly s=0), with only a modest increase for $B_e$ over the range [−aT, aT] and a larger increase for [−2aT, 2aT]. $B_e$ makes up for this by producing lower RMSE than $B_0$ for velocities in the upper two thirds of $B_e$'s velocity range. Presuming that the expected velocities are uniformly distributed, this leads to an 8% reduction in RMSE in the average case.

Figure 3:
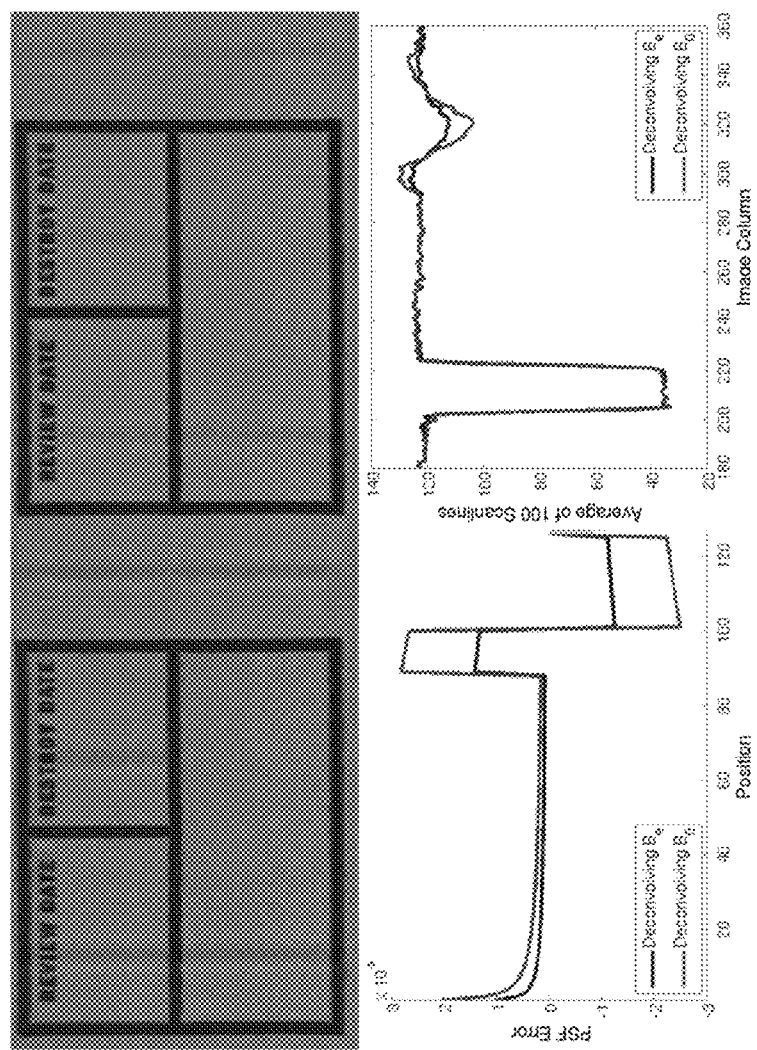
FIG. 3 illustrates a comparison between ghosting artifacts of de-convolving the discrete PSF $B_0$, in the top left image, to $B_e$, in the top right image) on the image of a cardboard box with black print. In the bottom left image, the difference between the object's actual PSF and the two de-convolution kernels is shown. In the bottom right image, grayscale intensity of the reconstructed images across a vertical edge in the images, showing the edge (columns 200-220) and ghost edge (columns 290-340), is presented.

FIG. 3 illustrates a comparison between ghosting artifacts of de-convolving the discrete PSF $B_0$ (top left image) to $B_e$ (top right image) on the image of a cardboard box with black print. Ghosting artifacts in the $B_0$ result are reduced in the $B_e$ image. In the bottom left image, the difference between the object's actual PSF and the two de-convolution kernels is shown. In the bottom right image, grayscale intensity of the reconstructed images across a vertical edge in the images, showing the edge (columns 200-220) and ghost edge (columns 290-340), is presented.

Qualitatively, the result of de-convolving $B_0$ when the actual PSF (for s≠0) has a clipped tail is the introduction of a ghosting artifact. In previous implementations, this was used to motivate the introduction of a variable opacity optical hardware element to reduce ghosting. Without introducing additional hardware, de-convolving $B_e$, as discussed with respect to embodiments of the present disclosure, provides a similar reduction in the ghosting artifact, as illustrated in FIG. 3. This is because the difference in the object's PSF and $B_e$ is less than the difference between the object's PSF and $B_0$ at all positions, as shown in the lower-left plot.

Tradeoff with Exposure

The range of velocities over which motion invariance is achieved may decrease with increasing exposure time. The intuitive explanation of this problem can be understood, for example, with two constraints:

The maximum displacement of the lens element is limited by the size of the lens cavity.

The lens element must remain in motion throughout the exposure.

In other words, if two motion invariant captures each use the full range of lens motion, the one with longer exposure time must move slower, and thus will not be able to stabilize some of the higher velocity motion stopped by the shorter exposure, in some instances.

In these situations, where it is assumed that the lens aperture can't be widened to keep exposure time constant, there are a couple options:

Increasing gain (ISO) and keeping exposure time fixed, in order to use the same value of a and preserve the extent of motion invariance.

Alternatively, the acceleration a can be reduced to keep photon count high.

While it is clear that the second option will produce a better image for stationary objects, it is not obvious which of these approaches will produce the better quality image for non-zero object velocities. To quantify this tradeoff, two options have been modeled and simulated below. For the first option, a model for the change of the variance of noise η as a function of changing sensor gain is needed. The gain is quantified, in terms of the camera's ISO setting, and the noise model used for HDR capture optimization is adapted. The change in noise variance as a function of changing ISO from G1 to G2 works out to $$\text{Var}(\eta_1) - \text{Var}(\eta_2) = \frac{\Phi 2T + \sigma_{read}^2}{U^2}(G_1^2 - G_2^2), \quad (4)$$

where ϕ2T is the signal dependent term, σ² read is due to read noise, and U is a camera dependent constant. Since this analysis dictates that two strategies for the same camera are compared, capturing the same scene with a fixed exposure time, the fraction is treated as a constant $k_{ISO}$ such that $$\text{Var}(\eta_1) - \text{Var}(\eta_2) = k_{ISO}(G_1^2 - G_2^2). \quad (5)$$

Several images of a stationary scene were captured at different ISO settings in order to calibrate the camera-dependent value of $k_{ISO}$ 1. Using this value and equation 9, blurring can be simulated (equation 2) and RMSE computed after de-convolving $B_e$.

Figure 4:
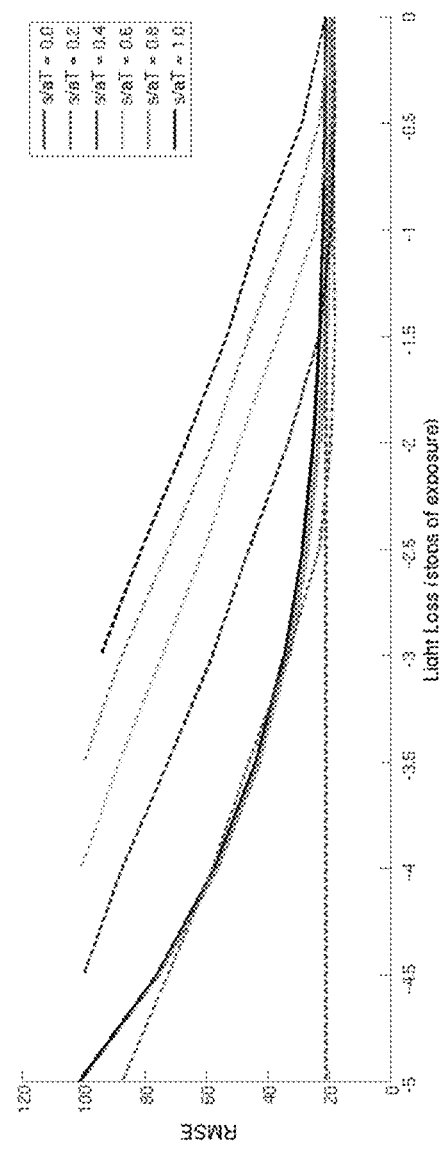
FIG. 4 compares the reconstruction performance of low-light motion invariance options over a range of subject velocities.

This can, for example, be done over several stops of ISO increase, for several values of s∈[0, aT], and the performance curves for option 1 shown in FIG. 4 are generated. What this shows is that de-convolution performance can be consistent for different values of s, but that the increase in ISO can lead to decreasing performance (higher RMSE) in low-light settings.

Evaluating the second option (increasing the exposure time while keeping ISO constant) requires only that the motion invariant PSF for a range of velocities against a lens acceleration a which changes as a function of light loss is simulated. It should be noted that as an example, a Canon 60D, has a $k_{ISO}$=1.1233e-5.

FIG. 4 compares the reconstruction performance of low-light motion invariance options over a range of subject velocities. Solid lines (mostly overlapping) show the performance of increasing ISO while keeping exposure time constant (one option). Dashed lines show the performance of increasing the exposure time while keeping ISO constant (an alternative option).

Keeping the maximum lens displacement D constant, a changes in response to increasing exposure time from $2T_1$ to $2T_2$ as $$a_1 T_1^2 = D = a_2 T_2^2. \quad (6)$$

So, when available light is reduced by one stop, T doubles and a is reduced by a factor of 4. If object velocity s normalized by aT is expressed, the one stop reduction in light results in the normalized value of s doubling. So the RMSE impacts of the second option can be found by re-arranging the results from FIG. 2. These impacts are shown alongside the first option in FIG. 4.

Comparing the RMSE impacts of the two alternatives, it can be identified that the second option (increasing exposure time) can provide consistent performance for stationary objects, in many instances. However, the performance of the second option can decrease quickly with light for non-stationary objects, performing better than the first option for s<aT/5 and performing worse for larger values, in some situations.

Qualitatively, the first option's RMSE is due to amplification of the noise component which does not depend on s, whereas the second option's RMSE is due to increasingly strong ghosting artifacts with s. Due to this, and consistent with a viewpoint that the moving parts of the scene are more interesting than stationary ones, the first option can be adopted and ISO is increased in response to reduced illumination.

Motion Invariance Via Stabilization

A motion invariant camera example, for use in embodiments of the present disclosure, is made of a stock Canon 60D DSLR body with a modified Canon EF 100 mm f/2.8 L Macro IS lens. Components of this lens that can be beneficial to the present disclosure include sensors that sense camera motion and a stabilizing lens element that can be moved in at least one dimension (e.g., side to side with respect to the image sensing element).

Figure 5:
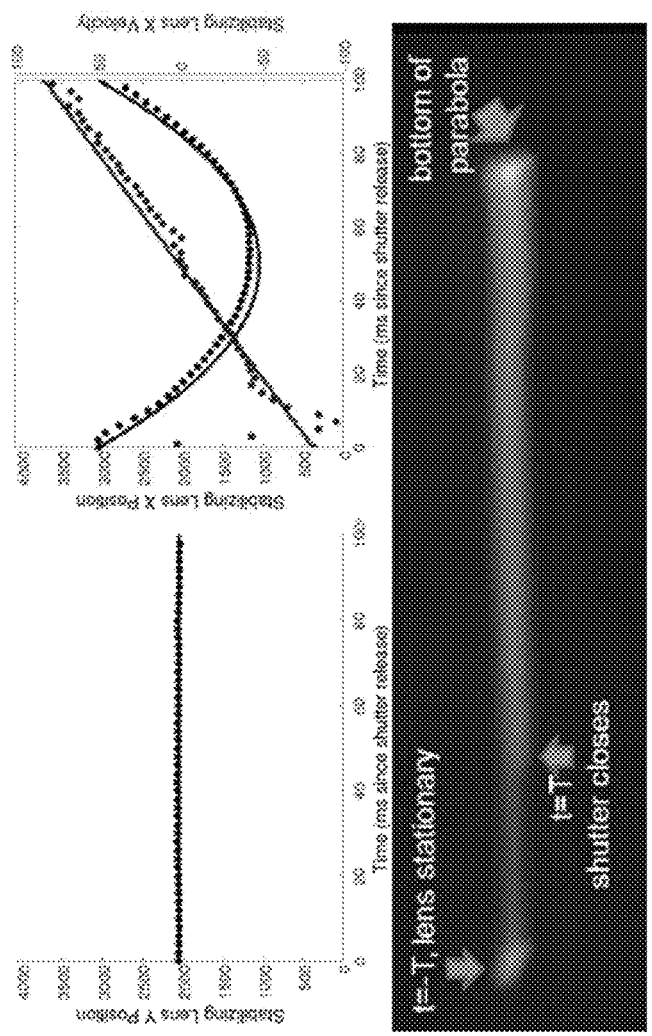
FIG. 5 illustrates desired (solid line) versus actual (points) motion. The left plot shows lens Y position for a horizontal motion. The right plot shows lens X position and velocity. The bottom image shows the captured trajectory of a stationary LED light source.

FIG. 5 illustrates desired (solid line) versus actual (points) motion. Left plot shows lens Y position for a horizontal motion, with minimal unintended motion. Right plot shows lens X position (black, left axis) and velocity (blue, right axis). Positions are given in 12-bit ADC samples. The bottom image shows the captured trajectory of a stationary LED light source.

FIG. 5 illustrates the performance of the control hardware and software (e.g., motion providing element and computing device readable instructions), showing the desired versus actual motion of the lens along the X and Y axes. The left plot illustrates that there can be a small amount of unintended motion along the Y axis. The right plot shows the intended parabolic motion and velocity along the X axis, along with the actual motion and velocity.

Here, the biggest effect is that, due to a delay between the shutter opening and the hot shoe signal, the lens rests at its starting position for about 2 ms before motion starts. This results in a high velocity error for the first 4 ms, after which the actual velocity matches the intended value fairly well. Also, the delay prevents the lens from returning to its starting position by the end of the exposure, as is illustrated by the image of a stationary LED light source in the scene. This reflects the PSF of the image, which has two peaks: one arising from the slowdown at the bottom of the parabola, and the second arising from the delay at the beginning of exposure. In some embodiments, the delay varies slightly from exposure to exposure, as do the smaller deviations from the intended motion. The consequences of these deviations, and of the PSF's second peak, are discussed in the next section.

Motion Aware Motion Invariance

In this section, the multiple uses of motion information, to improve the quality of the de-convolved image and to improve the range of object velocities over which invariance is achieved, are discussed. In that this is accomplished without estimating the velocity of moving objects in the image, this approach is consistent with the philosophy of motion invariance: that velocity/blur estimation is fraught with difficulty. By contrast, estimating the motion undergone by the camera or its lens during motion is less problematic, particularly using the IS lenses which enables motion invariance.

The section entitled Motion Aware De-blurring below illustrates how the actual motion of the stabilizing lens, which may differ from the desired motion due to a number of factors, can be used to inform the de-convolution step and improve the quality of the output image. The present disclosure also shows how asymmetric motion priors on the scene can be used to improve the performance of motion invariance by modifying the lens trajectory. Lastly, the use of camera motion, measured before exposure to change the acquisition itself, is discussed.

An example imaging device, has a Canon Macro IS lens, which includes gyroscopes and an accelerometer (e.g., a three axis accelerometer), allowing for the measurement of camera rotation and acceleration, from which velocity can be inferred by integration, which can be useful in various embodiments discussed herein. Using the imaging device's velocity, the parabolic lens motion can be modified in such a way as to provide the same range of subject velocity invariance from a moving imaging device as from a stationary one.

Unless otherwise noted, all of the images shown in this section were acquired with the example imaging device discussed above, with 100 ms exposure time. The images were captured in the Canon 60D's medium resolution mode to keep file sizes down.

Motion Aware Deblurring

As with any mechanical system, the control system for lens motion may not perfectly reproduce the intended parabola. Moreover, the motion may vary from one exposure to the next, due to fine-scale differences in, for example, the amount of time between the shutter's half and full depression (during which time the lens goes to the designated start position).

While these motion imperfections may be unavoidable, they need not reduce the quality of the resulting image. Because the hardware can already be equipped to capture lens position during exposure for the purposes of motion control, this data can be stored and used in de-convolution.

Figure 6:
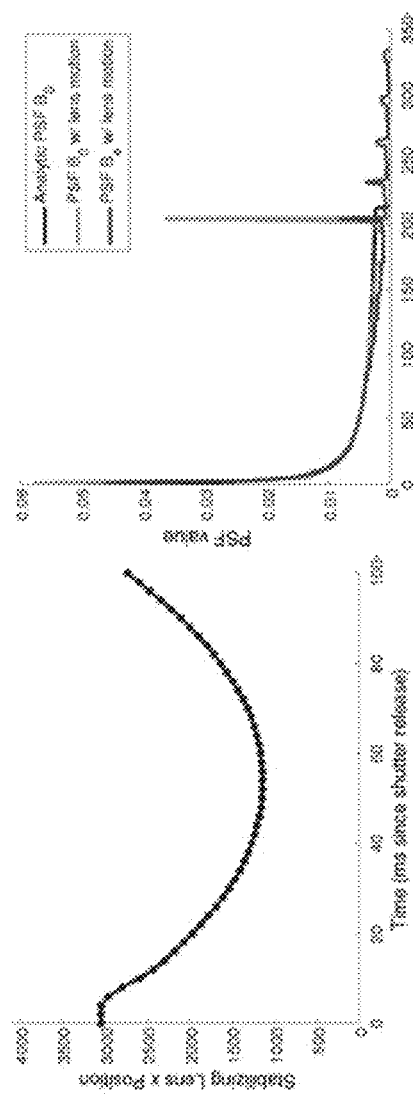
FIG. 6 uses the observed stabilizing lens positions to generate the PSF for deblurring. The left plot shows observed X positions of the lens over a 100 ms exposure. The right plot shows the analytic PSF $B_0$ for a stationary object (blue curve), along with the PSF of a stationary object $B_0$ using observed lens positions (green), and the PSF's expected values $B_e$ over a range of five non-zero velocities (red).

During exposure, the microcontroller saves the actual (x, y) lens position to memory. To generate the real imaging device PSF, a curve fitting function (e.g., a linear spline) is fit to the recorded x and y positions, as shown in FIG. 6. The time value can be interpolated at intersections of the lens position with pixel boundaries (i.e. parallel lines spaced every 9.4 ADC values) and differentiated in order to determine the amount of time that light from a moving point fell on that pixel.

The time differentials can be normalized by the total exposure time in order to produce a PSF whose elements sum to 1. Because the initial position of the lens with respect to the pixel boundaries is unknown, and in order to reduce noise inherent in differentiating the position values, this process can be repeated for several different initial sub-pixel positions and average them.

FIG. 6 uses the observed stabilizing lens positions to generate the PSF for deblurring. Left plot shows observed X positions of the lens over a 100 ms exposure (Y values have minimal motion, and are ignored). The right figure plots the analytic PSF $B_0$ for a stationary object (blue curve), along with the PSF of a stationary object $B_0$ using observed lens positions (green), and the PSF's expected values $B_e$ over a range of five non-zero velocities (red).

This process gives an estimate of the PSF of stationary objects in the scene. As shown in FIG. 6, this estimate of $B_0$ (the green curve) has a second peak which is not present in the analytic $B_0$ (blue curve), due to the initial delay caused by the hot shoe timing. It is also less smooth than the analytic form, due to imperfections in the actual lens motion.

As discussed above, the PSF $B_0$ corresponding to stationary objects can perform worse for fast-moving objects than the PSF $B_e$ that explicitly accounts for non-zero velocities, in some instances. So, in order to generate the final PSF for deblurring, various constant object velocities can be added to the observed lens positions and repeat the spline fitting and differentiation for each. The red curve shows the average of 5 such PSFs, which can be used as the PSF $B_e$ for de-blurring.

Figure 7:
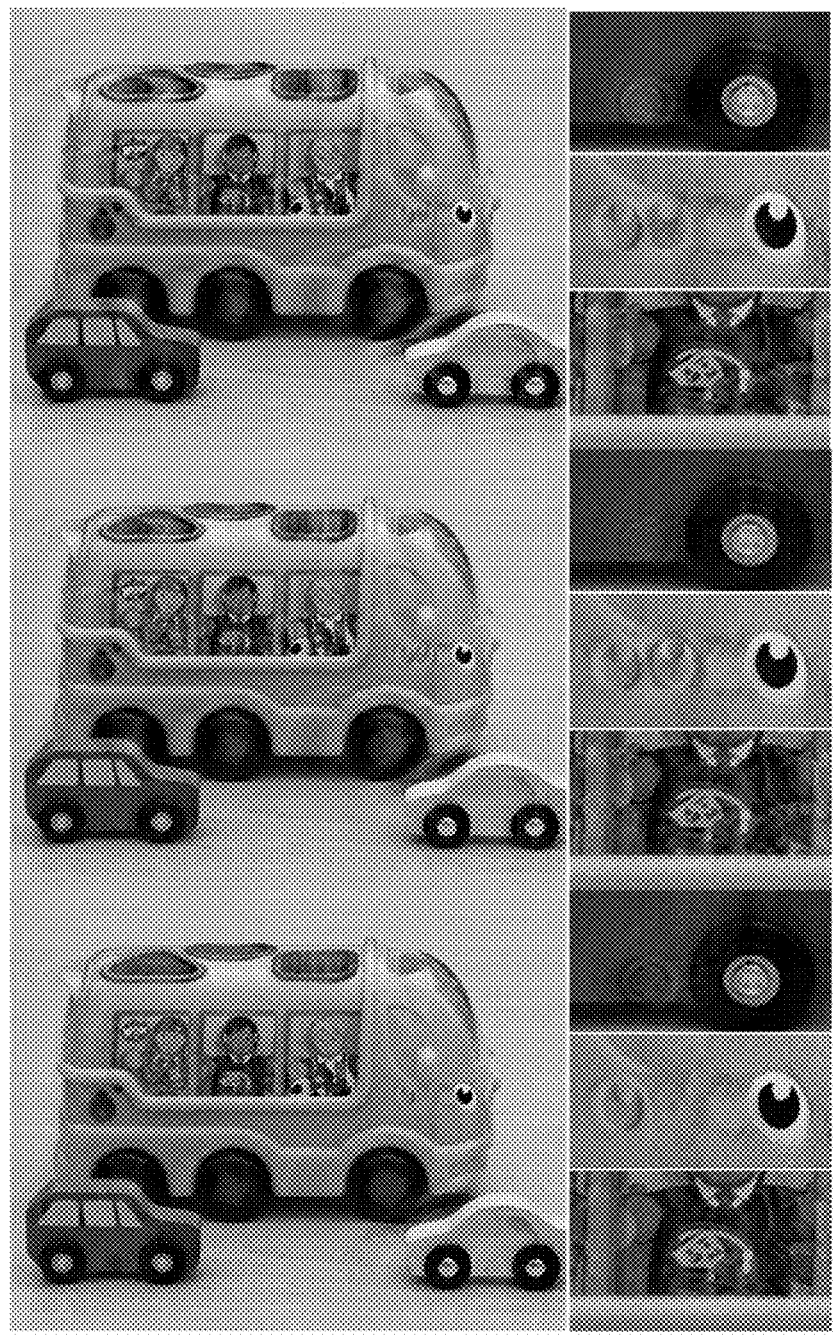
FIG. 7 compares the performance of the three PSFs from FIG. 6 on an image of two small, stationary wooden cars and a plastic bus moving from left to right.

FIG. 7 shows the same motion invariant image de-blurred with these three PSFs. From the insets, it can be observed that the PSF $B_0$ determined from the real lens motion (middle row) has a slightly reduced echo on the stationary blue car than the analytic $B_0$ (top row), which does not account for the hot shoe delay. It can be noted that the remaining echo artifact is likely due to saturation of pixels from the shiny metallic region. The PSF $B_e$ determined from real lens motion (bottom row) does slightly worse than $B_0$ for the stationary car, but gives a higher quality reconstruction of the moving bus than either version of $B_0$. One of the echoes of the bus's headlight is removed (middle inset) and the blue region in the bus's window (bottom inset) has fewer artifacts.

FIG. 7 compares the performance of the three PSFs from FIG. 6 on an image of two small, stationary wooden cars and a plastic bus moving from left to right. The descriptions of the images are as follows: Top row: analytic PSF $B_0$. Middle row: PSF $B_0$ using actual lens motion. Bottom row: PSF $B_e$ using actual lens motion.

In the sense of a bandwidth budgeting analysis, symmetric motion invariance can be a sub-optimal allocation of the available bandwidth. In order to provide the highest quality reconstruction over the asymmetric range of expected velocities, another motion can be used.

If we consider a scene where a velocity prior is uniform over a range [0, S], what is the ideal lens motion? Given the exposure time 2T and ISO G utilized to get a well-exposed picture, one way would be to solve 2aT=S to determine a, and then use a half parabola with that acceleration.

But that reduces the exposure time by a stop and would require a corresponding increase in ISO. Since a can't be arbitrarily increased due to space limitations within the lens, the other option is to use the same exposure time 2T and reduce a in order to make the half parabolic motion last for the entire exposure.

These are exactly the two criteria that we considered in the section titled Tradeoff With Exposure. Based on that analysis, the half parabola can be selected over a shorter exposure time T and increase the ISO to maintain constant exposure.

Figure 8:
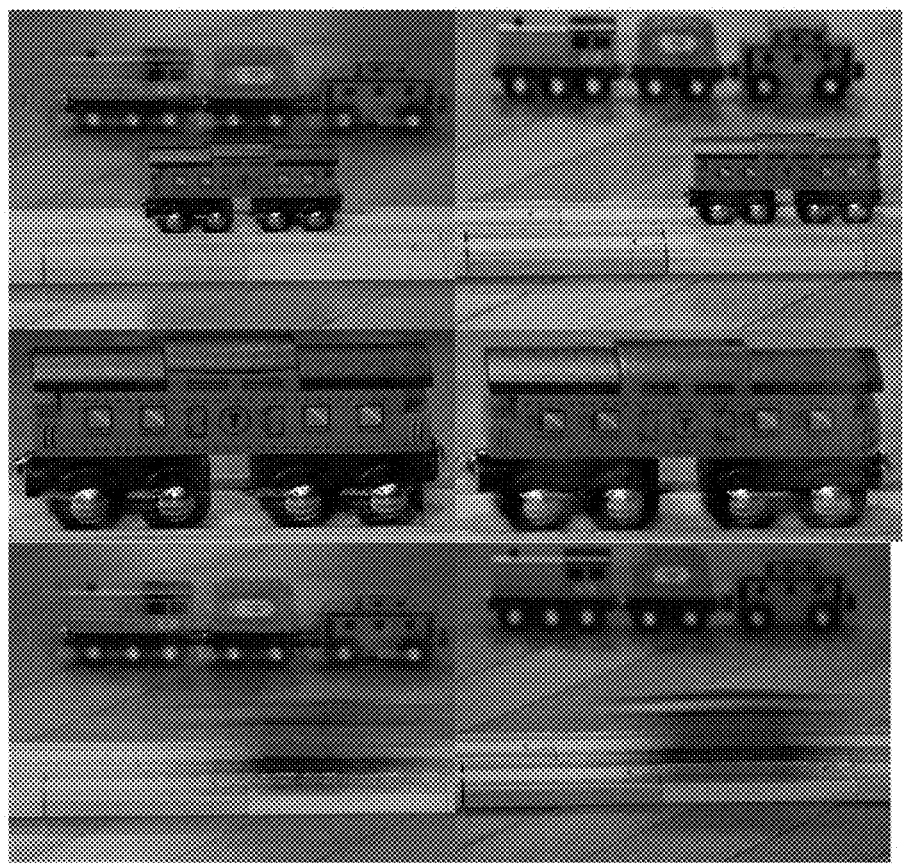
FIG. 8 compares the performance of a half parabola (left column) with the full parabolic motion invariance (right column).

FIG. 8 demonstrates that the half parabola motion provides a higher quality reconstruction than the full parabola for objects moving in the expected direction. The tradeoff, of course, is that the half parabola is unable to provide a good reconstruction of objects that don't obey the prior (e.g., if the motion is in the wrong direction, it will not be stabilized by the lens motion and the real PSF will have no peak). As a result, the reconstruction may be of low quality, comparable to a traditional camera's image.

Velocity Aware Motion Invariant Capture

Motion invariance can be particularly beneficial for certain imaging device motions, for example, a linear, constant-velocity motion of the imaging device in a direction parallel to a sensor plane. Instances of such blur are less common, but include cases like taking image out the side of a moving car.

In this section, the implications of such imaging device motion on the range of invariance to object motion are discussed. Then, it is described how the accelerometers and gyros included in our stabilizing lens can be used to estimate imaging device velocity immediately before the start of exposure. Finally, it is demonstrated that the addition of an offset velocity in the parabolic motion can be used to compensate for a limited range of imaging device velocity.

FIG. 8 compares the performance of a half parabola (left column) with the full parabolic motion invariance (right column). When the motion prior is asymmetric, and a half parabola is used to capture rightward motion, the reconstruction quality is improved. The first row shows a scene with rightward motion, and the second row shows a closeup of the train. Reconstruction quality appears to be higher from the half parabola, though both images have reconstruction artifacts due to specular reflections off of the metal parts of the wheel. When the motion does not obey the asymmetric prior distribution, the half parabola cannot give a good reconstruction (third row, left); a traditional image capture with the same object velocity and exposure time is shown (third row, right).

Figure 9:
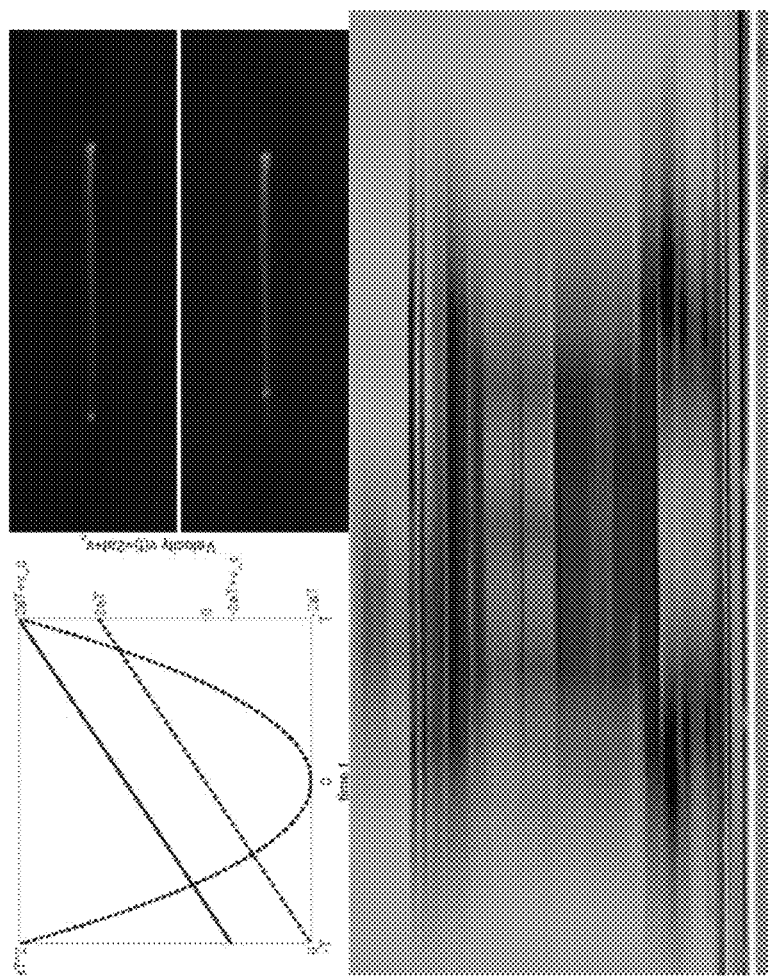
FIG. 9 illustrates the effect of a non-zero camera velocity on motion invariance. Within the camera's reference frame, parabolic motion and a symmetric range of velocities are still achieved (dashed lines). The right images show the appearance of a stationary red dot in the world through a stationary camera (top) and a moving one (bottom), both executing the same parabolic lens motion. The bottom image shows a motion invariant image which fails to stop the motion of a moving train due to non-zero camera velocity.

FIG. 9 illustrates the effect of a non-zero camera velocity on motion invariance. Within the camera's reference frame, parabolic motion and a symmetric range of velocities are still achieved (dashed lines). Within the world reference frame, however, the camera's velocity offsets the lens velocity and changes the range of motion invariance from $[-2aT, 2aT]$ to $[-2aT+v_c, 2aT+v_c]$. Right images show the appearance of a stationary red dot in the world through a stationary camera (top) and a moving one (bottom), both executing the same parabolic lens motion. The bottom image shows a motion invariant image which fails to stop the motion of a moving train due to non-zero camera velocity. No useful de-blurred result can be recovered from this image.

The Effect of Camera Motion on Invariance

Suppose that a camera is translating laterally with constant velocity $v_s$ during the exposure of a motion invariant image. In past work, the motion of the stabilizing lens would be executed as usual, giving a parabola and symmetric velocity range about zero relative to the camera's reference frame. Considering the camera velocity, the motion of the stabilizing lens element in the world reference frame becomes $$x(t)=at^2+v_ct, \quad (7)$$

and the lens velocity becomes $$v(t)=2at+v_c. \quad (8)$$

This shifts the range of velocity invariance from $[-2aT, 2aT]$ to $[-2aT+v_c, 2aT+v_c]$, as illustrated in FIG. 9. That figure also illustrates that the camera's velocity causes a stationary object in the world to have the same PSF as an object with velocity $v_c$ observed from a stationary motion invariant camera.

Presuming that the lens acceleration a was chosen to provide a symmetric invariance range of $[-2aT, 2aT]$, the presence of camera motion may be problematic. Objects with velocities in the range $[-2aT, -2aT+v_c]$, for instance, may no longer be stabilized and may not have reasonable quality in the de-blurred image. The image in FIG. 9 illustrates such a case, where the shift in the range of invariance prevents the stabilization of a moving train. In this example, no reasonable reconstruction can likely be produced from this image. In order to avoid this unintended consequence of camera motion, it can be proposed to measure the camera velocity and compensate for it by modifying the lens's motion.

Velocity Estimation from Lens Sensors

In order to compensate for this effect of camera motion on the range of object motion invariance, it can be useful to estimate the camera's velocity. While the accelerometers and gyros included in the stabilizing lens are generally used for relative measurements during exposure, these same sensors can be used to estimate absolute camera velocity. A second microcontroller can be added, for example, to capture the output of the three axis accelerometer, and sample data $\rightarrow -a=(A_x, A_y, A_z)$ after a low-pass filter is applied.

At a high level, velocity is estimated by integrating the accelerometer's output, but can have a couple complications. For example, integrated velocities from the accelerometer may tend to drift over long periods of time. This can be avoided, for example, by adding a reset button or other suitable mechanism which zeros the integration and do so when the imaging device is at rest. Additionally, while the accelerometer's output measures physical acceleration, it has an additive component of 9.8 meters/second$^2$ (m/s$^2$) in the direction of gravity. The separation of these two components may be ill posed when the accelerometer's three measurements are the only data available, and may be made well-posed when the gyroscope outputs are used in estimation.

For the limited purpose of demonstrating the benefits of motion aware motion invariance, the engineering effort needed to solve the source separation problem can be avoided. The accelerometer outputs can be averaged over a three second interval when the camera is stationary, and this can be used as the estimate of gravity.

$$\overline{g}=(\overline{A}_x,\overline{A}_y,\overline{A}_z). \quad (9)$$

Experiments can then be carried out where the camera pose is fixed (i.e., eliminate rotations) by mounting the camera on a robot arm. This allows velocity to be estimated by integration $$\overline{v}_c=\int_t(a-g)dt. \quad (10)$$

Figure 10:
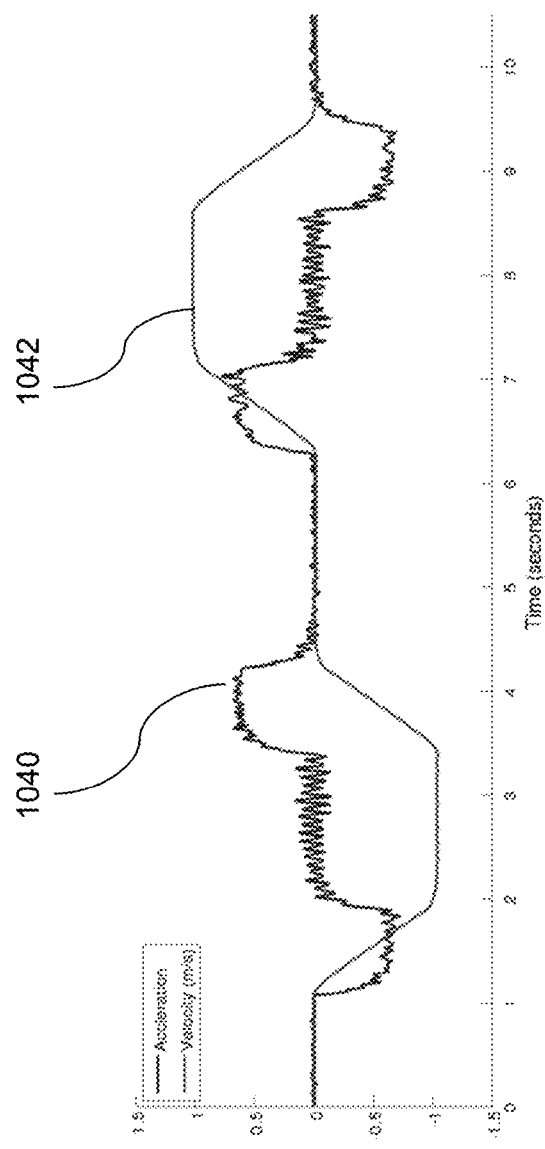
FIG. 10 illustrates the accelerometer outputs and estimated velocity in the X direction as the camera undergoes a back and forth motion along a linear track.

FIG. 10 illustrates the accelerometer outputs 1040 and estimated velocity 1042 in the X direction as the camera undergoes a back and forth motion along a linear track. The estimated velocities are within 10% of ground truth for the constant velocity segment. In our camera example, the microcontroller attached to the accelerometers continuously integrates to have a current velocity estimate at all times.

FIG. 10 provides a plot of the accelerometer output in the X direction, and a velocity estimation from integrating these readings. This data capture begins when the camera is stationary, and records while it accelerates, moves at a constant velocity of about 1 m/s, decelerates, and then completes the same sequence in the opposite direction.

Compensating for Camera Motion

Having estimated the camera velocity $v_c$ from the lens's accelerometers, the intuitive modification of the lens motion is to add a compensating $-v_c$ velocity term to the lens motion within the camera coordinate frame, $$v_{lens}(t)=2at-v_c, \quad (11)$$

and to integrate from here to get the lens position (within the camera's coordinate frame)

$$x_{lens}(t)=at^2-v_ct+x_0. \quad (12)$$

One complication which arises is that the starting position of the lens $x_{lens}$ (−T) cannot depend on the velocity estimate because, when the photographer presses the shutter release halfway, the controller must move the lens to the starting position and the camera velocity may continue to change. One solution is to fix the starting lens position and to make $x_0$ a function of $v_c$, so that $x_{lens}$ (−T)=$x_{start}$ for all values of $v_c$, by $$x_0(v_c)=x_{start}-aT^2+v_cT. \quad (13)$$

The values of $x_0$ and $x_{lens}$ can be pre-computed for several values of $v_c$ store them in the controller's flash memory, and the estimate of $v_c$ can be used at the time of the shutter release to select which to execute. While the accelerometer can measure fairly large velocities, the ability to compensate for high velocities may be limited by the amount of displacement D the lens can achieve. Even if the lens is allowed to travel outside of the 2048-by-2048 ADC area at the center of the field of motion, the maximum camera velocity that can be canceled is $$v_c \leq \frac{0.04 \text{ m}}{T}. \tag{14}$$

Here, again, a situation arises where minimizing exposure time produces a higher benefit, and where increasing ISO in order to achieve the desired camera motion invariance is a preferred strategy.

Figure 11:
FIG. 11 compensates for non-zero camera velocity in motion invariance. The right images show the appearance of a stationary red dot in the world through a stationary camera (top) and a moving one (bottom). The bottom row shows the de-blurred image of a train moving in the opposite direction of the camera when an embodiment of the present disclosure is utilized.

FIG. 11 compensates for non-zero camera velocity in motion invariance. Within the camera's reference frame, compensated parabolic motion and a range of velocities are asymmetric (dashed lines). Within the world reference frame, however, the camera's velocity offsets the lens velocity and centers the range of stabilized velocities at 0. Right images show the appearance of a stationary red dot in the world through a stationary camera (top) and a moving one (bottom). The bottom row shows the de-blurred image of a train moving in the opposite direction of the camera, which can only be stabilized due to the velocity compensation performed by an embodiment of the present disclosure.

FIG. 11 demonstrates the compensated motion trajectory, lens velocity in the camera reference, and lens velocity in the world reference. In this case, the estimated velocity is about 0.08 m/s. Despite not being very fast, this level of camera motion can prevent the symmetric parabola from achieving stabilization on an object moving in the opposite direction. But stabilization is achieved during the exposure with the compensated trajectory, allowing for the reconstruction of a sharp image of the same object.

The embodiments herein are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense. Further, as used herein, "a" or "a number of" something can refer to one or more such things. For example, "a number of ISOs" can refer to one or more ISOs.

Figure 12:
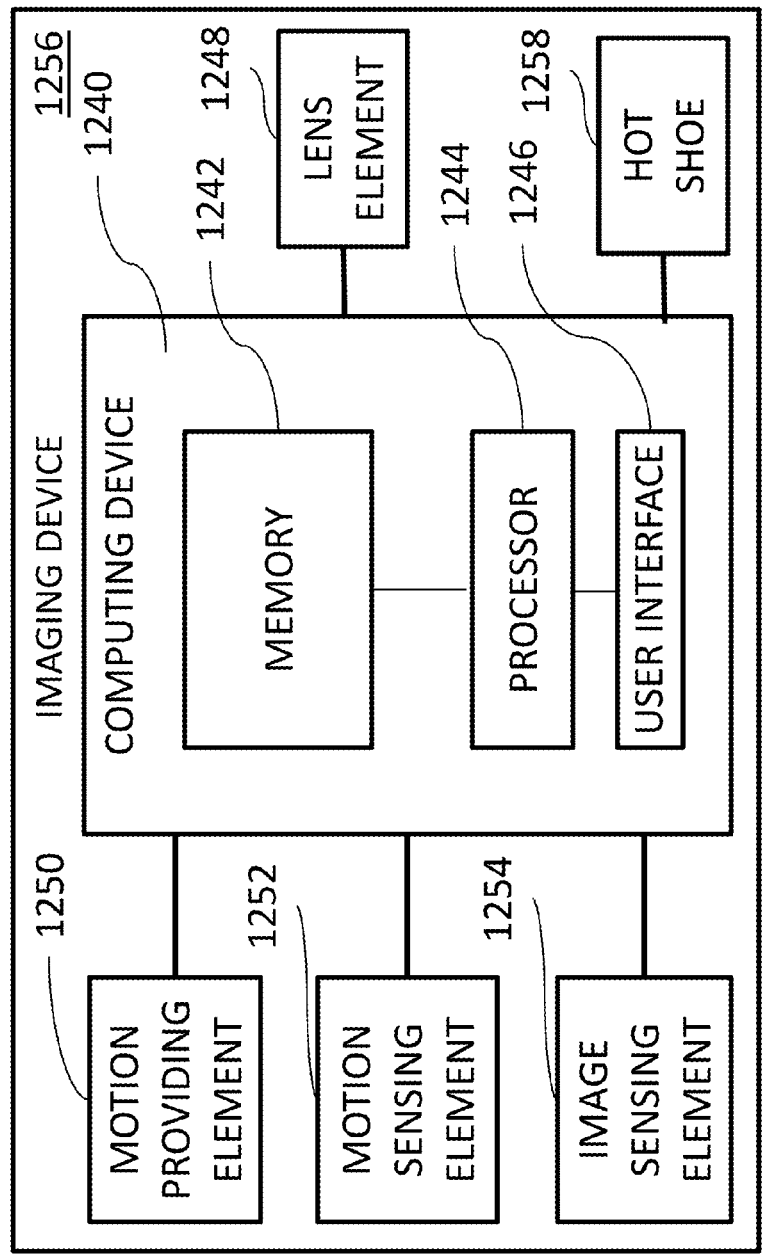
FIG. 12 illustrates an example of an imaging device embodiment of the present disclosure.

In various embodiments, the imaging device (e.g., camera) or another device having computing functionality can perform some or all of the functions discussed herein. FIG. 12 provides an example of an imaging device (e.g., camera) that can be used in the embodiments of the present disclosure.

For example, as illustrated in FIG. 12, an imaging device have an imaging device body 1256 and can include or be in communication (e.g., in a wired or wireless manner) with a computing device 1240 (i.e., a device having computing functionality, as described herein, can also include a computer readable medium (CRM) in communication with processing resources). CRM can be in communication with a device having processor resources. For example, the CRM can be computing device memory (e.g., memory 1242) and can communicate with a processor/controller (e.g., processor 1244).

The device can include a tangible non-transitory CRM storing a set of computer-readable instructions (CRI) executable by one or more of the processor resources, as described herein. The CRI can also be stored in remote memory managed by a server and represent an installation package that can be downloaded, installed, and executed.

Processor resources can execute CRI that can be stored on an internal or external non-transitory CRM. The processor resources can execute CRI to perform various functions. For example, the processor resources can execute CRI to perform a number of functions relating to the receiving of imaging and/or motion sensing element (e.g., sensing element 1252) data, the control and/or management of the one or more imaging and/or motion sensing elements, and/or control of the movement of one or more device components (e.g., via a motion providing element 1250) such as: the imaging device body 1256, one or more imaging sensing elements (e.g., sensing element 1254), and/or one or more lens elements (e.g., lens element 1248).

A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM can also include distributed storage media. For example, the CRM can be distributed among various locations. The non-transitory CRM can be integral, or communicatively coupled, to a computing device, in a wired and/or a wireless manner. For example, the non-transitory CRM can be an internal memory, a portable memory, a portable disk, or a memory associated with another computing resource (e.g., enabling CRI's to be transferred and/or executed across a network such as the Internet).

The CRM can be in communication with the processor resources via a communication path. The communication path can be local or remote to a machine (e.g., a computer) associated with the processor resources. Examples of a local communication path can include an electronic bus internal to a machine (e.g., a computer) where the CRM is one of volatile, non-volatile, fixed, and/or removable storage medium in communication with the processor resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path can be such that the CRM is remote from the processor resources such as in a network relationship between the CRM and the processor resources. That is, the communication path can be a network relationship. Examples of such a network relationship can include a local area network (LAN), wide area network (WAN), personal area network (PAN), and the Internet, among others. In such examples, the CRM can be associated with a first computing device and the processor resources can be associated with a second computing device.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor, such as a microprocessor.

As used herein, a motion providing element can, for example, be a motor that is connected to one of an image sensing element, a lens element, or an imaging device body. The motion providing element can be controlled by CRI stored in memory and executed by a processor/controller.

A motion sensing element can sense the motion of one or more of the above elements that has been actuated by a motor or is moving based upon movement of the imaging device (e.g., through movement by a user of the imaging device or the environment surrounding the imaging device).

An image sensing element, as used herein, is used to capture an image (e.g., of a scene of a portion of the environment surrounding imaging device) that can, for example, be stored in memory. In many cases, an imaging device may have a lens element that allows an area to be captured by the image sensing element to, for example, be focused among other effects lenses can provide to an imaging device.

As described herein, the present disclosure includes embodiments that present a method to automatically remove partial occlusion from a single photograph captured using a light field camera. By removing the requirement that the photographer capture several images using different settings without moving the camera, such embodiments of the present disclosure enable everyday photographers to improve the quality of images taken through fences or other intermediate layers.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Rather, inventive subject matter lies in less than all features of a single disclosed embodiment.

The invention claimed is:

1. A motion de-blurring system, comprising:
   an image sensing element;
   one or more motion sensors in an imaging device;
   a lens element that undergoes motion in the same direction as an object on an image during a capture, wherein the lens element undergoes motion via a motion providing element that moves the lens element with respect to the imaging device, wherein the lens element motion is not a zoom or a pan; and
   a processor configured to execute executable instructions to:
      de-blur the image captured by the sensing element via de-convolving a Point Spread Function (PSF), wherein the PSF is determined by a prior calibration, obviating the need for blur estimation; and
      interpolate a time value at an intersection of at least one of a number of lens positions with a pixel boundary.

2. The motion de-blurring system of claim 1, wherein a motion sensor records the actual motion of the stabilizing lens element.

3. The motion de-blurring system of claim 2, wherein the recorded actual motion is used to determine the PSF used in de-convolution.

4. The motion de-blurring system of claim 1, wherein a motion sensor records the motion of the camera body during exposure.

5. The motion de-blurring system of claim 4, wherein the recorded motion of the camera body is used to determine the motion of the stabilizing lens element.

6. The motion de-blurring system of claim 5, wherein the motion of the stabilizing lens element produces a 1D motion invariant PSF in the presence of non-linear camera motion.

7. The motion de-blurring system of claim 4, wherein the recorded motion of the camera body is used to determine the PSF used in de-convolution.

8. A motion de-blurring system, comprising:
   a motion invariant camera sensing element;
   a stabilizing lens element that undergoes motion, in the same direction as an object in an image during a capture, wherein the lens element undergoes motion via a motion providing element that moves the lens element with respect to the imaging device, wherein the lens element motion is not a zoom or a pan; and
   a processor configured to execute executable instructions to:
      de-blur the image captured by the sensing element via de-convolving a Point Spread Function (PSF) which incorporates prior information about object motion in the scene, obviating the need for blur estimation; and
      interpolate a time value at an intersection of at least one of a number of lens positions with a pixel boundary.

9. The motion de-blurring system of claim 8, wherein the PSF used for de-blurring is derived from one or more PSFs corresponding to objects with non-zero velocities.

10. The motion de-blurring system of claim 8, wherein the stabilizing lens element's motion and the PSF are configured to de-blur an image that captures objects moving in a direction as determined by the prior information of object motion.

11. The motion de-blurring system of claim 8, wherein the image captured by the sensing element is compared to a second image captured while the stabilizing lens is stationary, in order to separate moving objects from the stationary background.

12. The motion de-blurring system of claim 8, wherein prior information about the size of moving objects is used to segment moving objects from the stationary background.

13. The motion de-blurring system of claim 8, wherein the PSF used for de-blurring is designed to minimize reconstruction errors with respect to the prior information about object motion.

14. A motion de-blurring system, comprising:
   a motion invariant imaging device sensing element;

a motion providing element that provides motion to at least one of an imaging device body, an imaging sensor, or lens with constant acceleration during a capture of a moving object in an image by the sensor, wherein the motion provided is not a zoom or a pan; and a processor configured to execute executable instructions to:

control the motion of the at least one of the imaging device body, an imaging sensor, or lens;

interpolate a time value at an intersection of at least one of a number of lens positions with a pixel boundary; and de-blur the image captured by the imaging sensor via de-convolving a Point Spread Function (PSF).

15. The motion de-blurring system of claim 14, wherein the microcontroller saves at least one of a number of lens positions or time values, during exposure in the capturing of an image, in memory.

16. The motion de-blurring system of claim 15, wherein a curve fitting function is fit to the number of lens positions to generate a PSF.

17. The motion de-blurring system of claim 16, wherein multiple time values can be interpolated and differentiated in order to determine an amount of time that light from a moving point fell on a particular pixel.

18. The motion de-blurring system of claim 17, wherein the stabilizing lens element that undergoes motion such that de-blurring can be accomplished for multiple velocity magnitudes.

19. The motion de-blurring system of claim 14, wherein a motion sensor's output is used to determine a direction of a stabilizing lens' motion, to align the imaging device with the horizon.

* * * * *